United States Patent [19]

Yamamoto et al.

[11] 4,437,027
[45] Mar. 13, 1984

[54] MOLDED SUBMERSIBLE MOTOR

[75] Inventors: Sakuei Yamamoto; Mitsuhiro Nishida, both of Fukuoka, Japan

[73] Assignee: Mitsubishi Denki Kabushiki Kaisha, Tokyo, Japan

[21] Appl. No.: 337,911

[22] Filed: Jan. 8, 1982

[30] Foreign Application Priority Data

Jan. 17, 1981 [JP] Japan .................................. 56-6628

[51] Int. Cl.³ ............................................ H02K 7/10
[52] U.S. Cl. ...................................... 310/78; 310/43; 310/68 R; 310/71; 310/90; 361/33; 339/94 M
[58] Field of Search ...................... 310/87, 86, 43, 90, 310/71, 42, 68 R, 68 A, 68 B, 68 C; 361/33, 56, 91; 339/94 R, 94 M; 29/596; 318/325; 335/187, 202

[56] References Cited

U.S. PATENT DOCUMENTS 2,944,297  7/1960  Maynard .............................. 310/87
3,250,927  5/1966  Lung ................................... 310/87
3,457,866  7/1969  Komor ............................. 310/68 R
3,631,275  12/1971  Conard ................................ 310/71
3,997,232  12/1976  Dunaway ............................. 310/87
4,015,154  3/1977  Tanaka ................................ 310/43
4,053,196  10/1977  Dunaway ............................. 310/87
4,340,853  7/1982  Braun .................................. 363/33

Primary Examiner—R. Skudy
Attorney, Agent, or Firm—Sughrue, Mion, Zinn, Macpeak and Seas

[57] ABSTRACT

A molded submersible well motor comprises a hollow cylindrical frame 4 formed of resinous molding material into which a stator assembly having stator cores 2 and coils 15 is molded. End brackets 10, 11 also formed of resinous molding material are detachably secured to opposite ends of said frame to close the openings thereof. A surge absorber unit 6 is molded into the frame, and a starting switch 14 for said motor is molded into end bracket 10.

2 Claims, 5 Drawing Figures

FIG. 1
FIG. 2
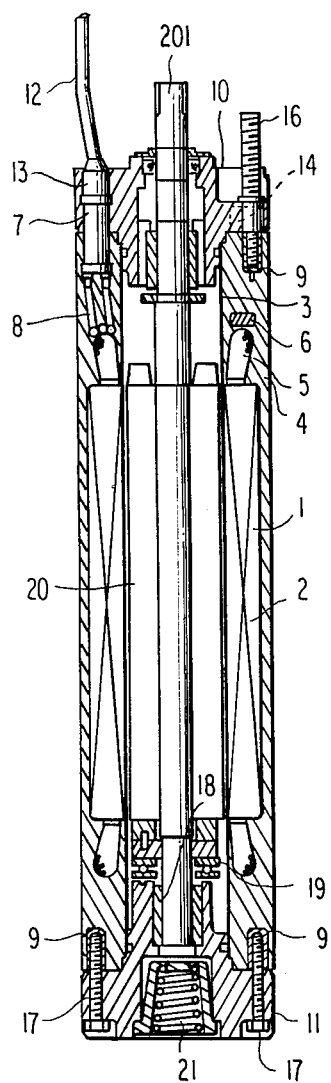
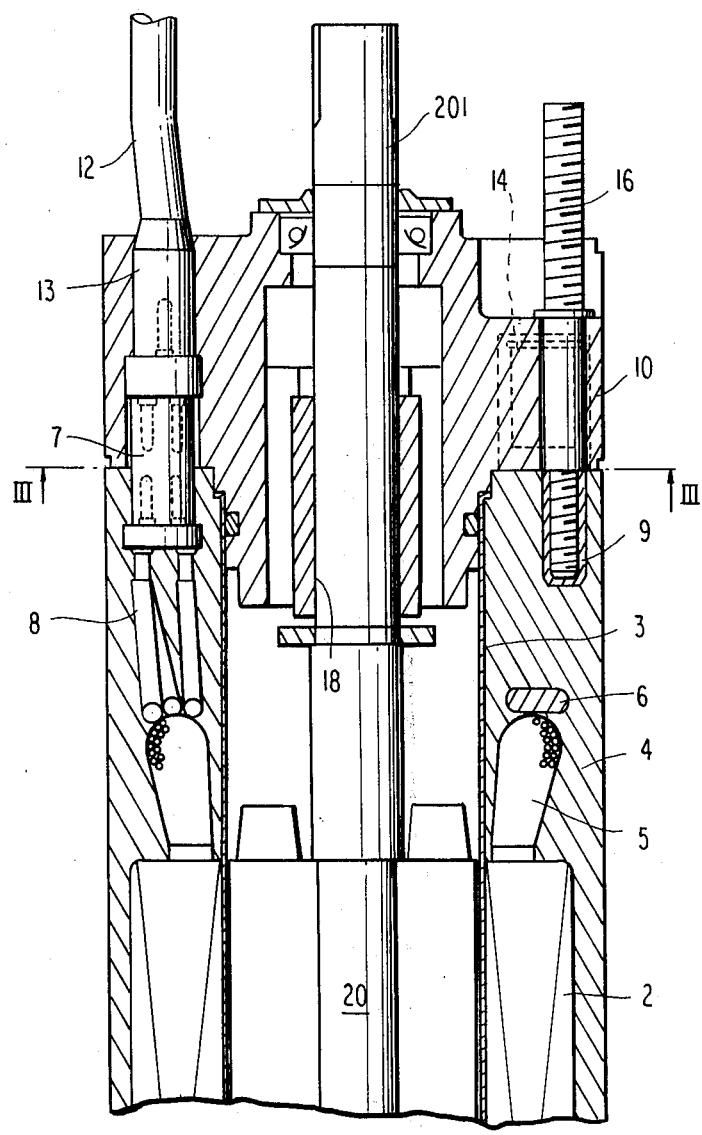

MOLDED SUBMERSIBLE MOTOR

BACKGROUND OF THE INVENTION

This invention relates to a molded submersible motor having a surge absorber unit and a starting switch unit, particularly suitable for use in a well.

DESCRIPTION OF THE PRIOR ART

A conventional submersible motor of the "canned" type has thin cylindrical metal liners of stainless steel rigidly fitted to the inner and outer circumferences of the stator, with liquid for lubricating the motor bearings filling the inner metal liner surrounding the rotor. While the canned type motor provides excellent electrical insulation for the stator coil, it requires a number of additional components such as flanges for securing end brackets or caps and for sealing the openings between both metal liners fixed to the stator. The brackets must be machined to close tolerances to enable watertight joints with the metal liners, which results in increased machining steps and manufacturing cost.

There has also been provided a molded type motor as disclosed in U.S. Pat. No. 4,015,154 to ostensibly eliminate the above-mentioned disadvantages of the canned motor. Such a molded motor gives rise to other problems, however, in that since the starting switch is embedded in the molded structure of the motor frame it is very difficult to replace or repair the starting switch unit, which is subject to frequent on-off operations and thus liable to become defective.

SUMMARY OF THE INVENTION

To overcome these problems the present invention provides a molded motor which comprises a hollow cylindrical frame formed of resinous molding material into which a stator structure having stator cores and coils is molded. End brackets are also formed of resinous molding material and are detachably secured to the frame to close the end openings thereof. A surge absorber unit is molded into the frame, and a starting switch for the motor is molded into one of the end brackets, which may easily be removed and replaced if the starting switch fails.

BRIEF DESCRIPTION OF THE DRAWINGS

FIG. 1 is a longitudinal sectional view of a molded motor embodying the features of the invention;

FIG. 2 is a detailed portion of the sectional view of the structure shown in FIG. 1 and is taken along the line II—II of FIG. 3;

DETAILED DESCRIPTION OF THE PREFERRED EMBODIMENT

Figure 3:
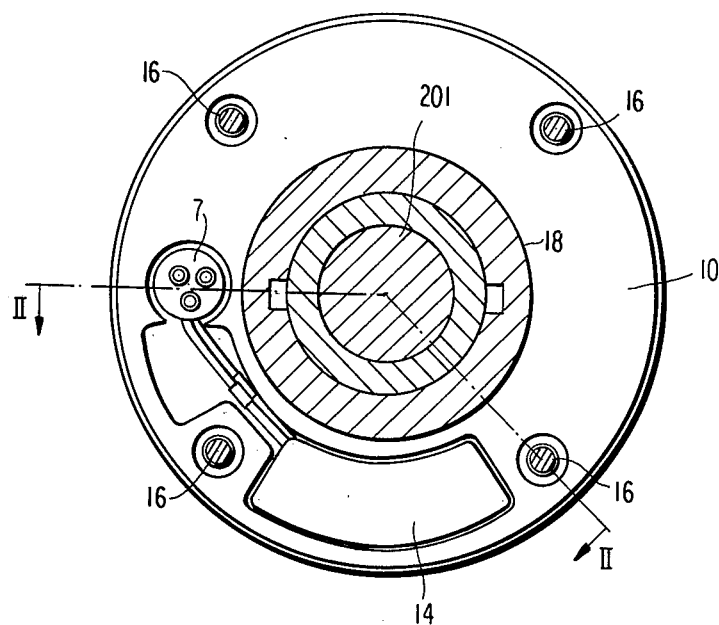
FIG. 3 is a transverse sectional view taken along the line III—III of FIG. 2.
Figure 4:
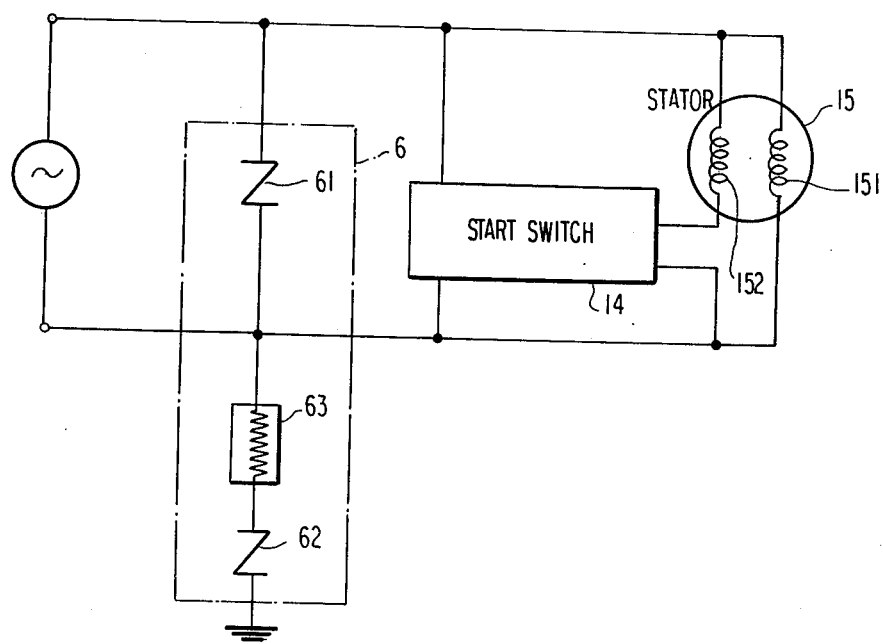
FIG. 4 is a circuit diagram of the molded motor shown in FIG. 1.

In FIGS. 1 through 4, which show an example of a molded motor according to the present invention, a stator 1 comprises a stator core 2 and a stator coil 15 (shown in FIG. 4). A cylindrical metal liner 3 of stainless steel is fixedly inserted into the inner circumference of the stator 1 to seal the inner bore of the stator structure and thereby protect the stator coil 15 from contact or contamination by the rotor area liquid, such as water containing propylene glycol antifreeze. The outer circumference and end portions of the stator core 2 and coil ends 5 are molded within a frame 4 formed of resinous molding material, such as polyester or vinyl resin.

A surge absorber unit 6 molded into and embedded within the frame 4 consists of, as shown in FIG. 4, a resistance element 63 and a pair of surge absorber elements 61, 62 formed of, for example, a plurality of voltage dependent resistivity elements whose main component is zinc oxide, connected in series and housed in a ceramic tube.

Figure 5:
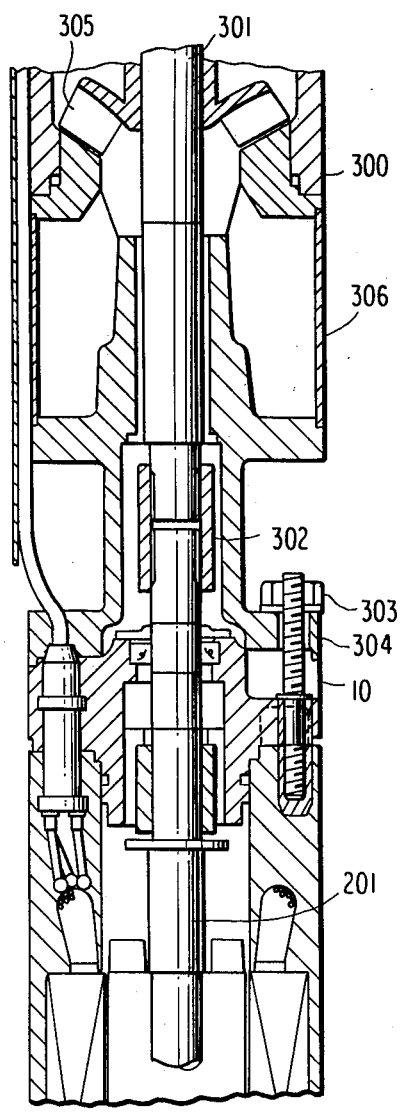
FIG. 5 is a longitudinal portion sectional view of a pump which is attached to the molded motor according to the present invention.

A connector 7, part of which is molded into the frame 4, is coupled to stator lead wires 8 and to the surge absorber unit 6 by further embedded wiring, not shown. A plurality of filler metals 9 with female threads are embedded in the frame 4 to receive bolts 16, 17 which fasten end caps or brackets 10, 11 to the frame 4 and at the same time, attach a driven apparatus such as a pump as shown in FIG. 5 to the molded motor. An upper connector 13 coupled to a power source cable 12 and a motor starting assist switch 14 are molded into the bracket 10 at the end whereat a pump or the like driven by the motor would be attached.

The starting assist switch 14 is an electronic switch which closes when the motor stops and opens after the motor has reached a predetermined speed to disconnect an auxiliary coil 152 from a main coil 151 to which the auxiliary coil is connected in parallel.

A rotor shaft 201 is rotatably supported in bearings located at the ends of the inner cylindrical metal liner 3. The bearing structure for the lower end of the rotor shaft 201 comprises a thrust bearing 19 and a radial bearing 18 embraced in a tubular extension of the bracket 11. The bearing structure for the upper end of the rotor shaft 201 comprises another radial bearing 18. The lubrication of both bearings is accomplished by the liquid (not shown) filled within the chamber of the rotor assembly 20 of the molded motor and sealed therein by the metal liner 3 and O-rings or the like provided between the brackets 10, 11 and the frame 4. In order to substantially equalize the liquid pressure within the molded motor with the external pressure of the submerging liquid a flexible cap member 21 is provided at the bottom of the bracket 11.

The pump 300 driven by the motor is attached to the upper end of the motor as shown in FIG. 5. An axle 301 of the pump 300 is fastened to the rotor shaft 201 by a spline coupling member 302. The pump 300 is fixed to the motor by way of coupling a bracket 304 of the pump 300 to the bracket 10 by the receive bolts 16 and nuts 303. When revolution of the rotor shaft 201 is transmitted to the axis 301 of the pump 300 through the coupling 302, a radial impeller 305 which discharges water filtered by a strainer 306 is rotated by a torque produced to the axis 301 of the pump 300.

As described above, the arrangement according to the present invention provides a molded motor with a low manufacturing cost by enabling a reduction of the number of parts used and the machining operations required. Furthermore, as it is possible to replace the starting switch unit, which is liable to become defective because of its frequent on-off operations, merely by replacing the bracket 10 in which it is embedded without disassembling the entire motor, a molded motor with ease of maintenance is provided.

What is claimed is:

1. A molded submersible motor, comprising:
   (a) an open ended, hollow cylindrical frame (4) formed of resinous molding material,
   (b) a stator assembly including a stator core (2) and a stator coil (15) embedded in said frame,
   (c) a rotor assembly (20) rotatably mounted inside of the stator assembly,
   (d) a pair of end brackets (10, 11) formed of resinous molding material and individually detachably secured to opposite ends of said frame to close the openings thereof,
   (e) a voltage surge absorber unit molded into said frame,
   (f) a starting switch unit of said motor molded into one of said end brackets positioned at an end of the motor adapted to be coupled to an apparatus driven by said motor,
   (g) a lower connector (7) molded into said frame and coupled to said stator coil (15) and said voltage surge absorber unit via lead wires (8) embedded in said frame, and
   (h) an upper connector (13) molded into said one of said end brackets for coupling a power source cable (12) to said lower connector and said starting switch unit.

2. A molded motor according to claim 1, wherein a liquid for lubricating bearings (18, 19) of a shaft (201) of said rotor assembly is sealed within said motor, and a thin cylindrical metal liner (3) for sealing an inner bore of the stator assembly to protect and isolate the stator coil from said liquid is affixed to an interior periphery of the stator assembly.

* * * * *